July 2, 1963
R. G. SMITH ETAL
3,096,281
FILTER CONSTRUCTION
Filed Nov. 20, 1958
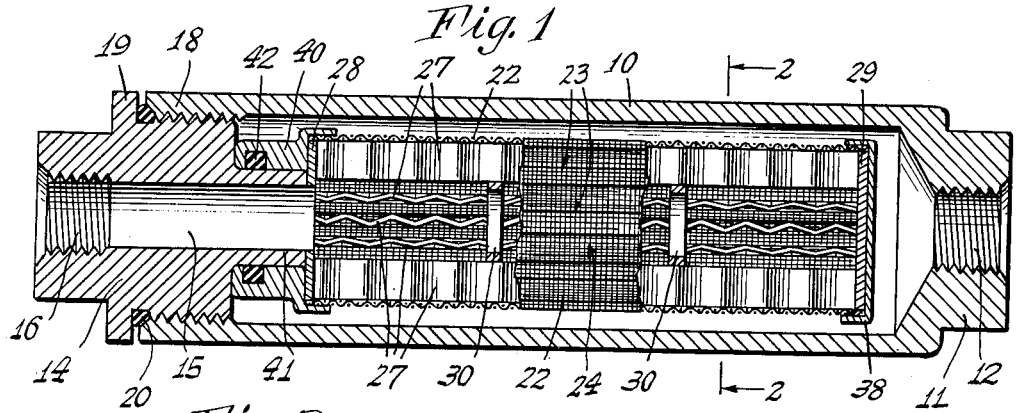
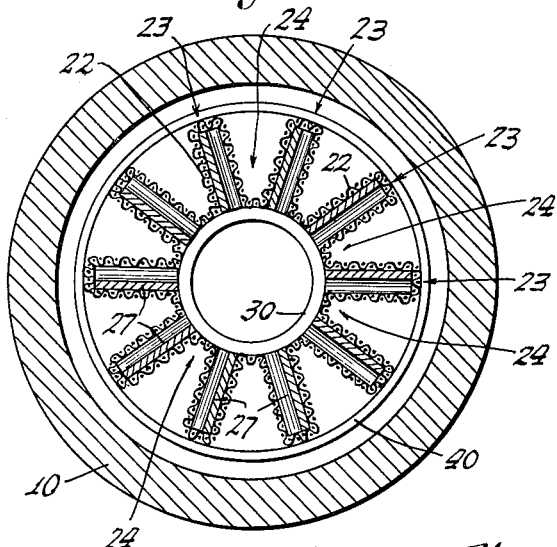
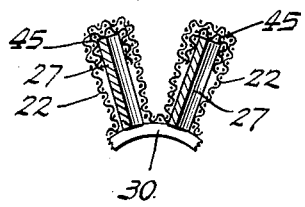
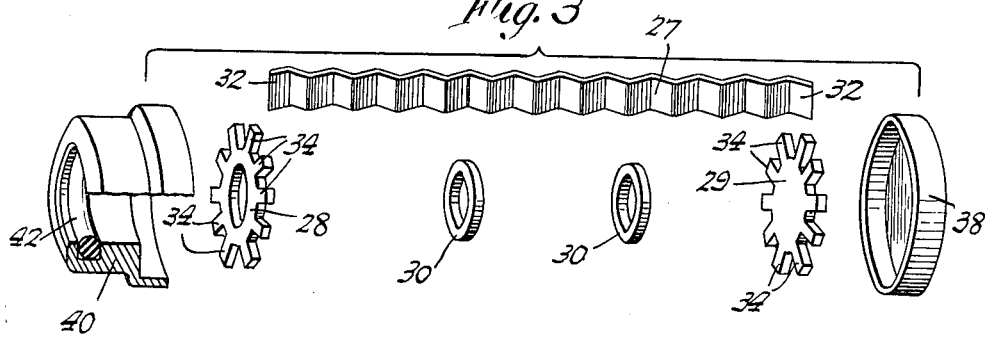
INVENTORS
*Richard G. Smith*
*James M. McMahon*
BY
*Munn, Liddy, Daniels & March*
ATTORNEYS 3,096,281
FILTER CONSTRUCTION
Richard G. Smith, Lake Hiawatha, and James M. McMahon, Caldwell, N.J., assignors to Screen Products, Inc., Caldwell, N.J., a corporation of New Jersey
Filed Nov. 20, 1958, Ser. No. 775,272
3 Claims. (Cl. 210—487)

This invention relates to filter structures, and more particularly to structures of this type wherein a thin, foraminous filter or screen sheet constitutes the filter element, being supported by rigid structural members so that it is held against collapse as a fluid is passed through it.

An object of the present invention is to provide a novel, improved small and compact filter construction wherein a thin sheet-like screen element is supported by rigid members, said filter construction being characterized by the maximum possible, practical utilization of the screen material and by a high efficiency in consequence of less of the screen material being needed to accomplish a given filtering requirement, to the end that there is effected an appreciable reduction in manufacturing cost.

A further object of the invention is to provide an improved filter construction as above, involving a supported thin sheet-like screen element, wherein the said element is of annular or tubular configuration and is internally supported in a manner which does not require a tubular or pipe-like center support, thereby to effect a further reduction in cost and an added economy in manufacture.

Yet another object of the invention is to provide an improved filter construction in accordance with the foregoing, wherein superior filtering characteristics are had in the smaller sizes as compared with disk-type filters.

An additional object of the invention is to provide an improved filter structure as above set forth, wherein the pressure drop through the unit is not greatly different from disk-type filter units of the same size and rating.

Another object of the invention is to provide, in a filter structure of the annular or tubular type, an improved supporting frame or cage construction which, while being simple and economical to manufacture, is sturdy and able to resist high differential pressures.

A feature of the invention resides in the provision of a novel inside frame or cage construction for a tubular-type filter screen, which provides a complete and full support of the screen element while utilizing to the maximum extent the available area of said element. This is accomplished in part by the provision of corrugated ribs disposed edgewise to the sheet screen element to effect a sturdy support of the latter through a line contact having a greatly increased length, as compared with the overall length of the filter.

Another feature of the invention resides in the provision of a frame or cage structure employing corrugated ribs or supporting strips, which structure is readily adaptable to different types and shapes of filter and screen elements.

A still further object of the invention is to provide an improved filter structure as above set forth, wherein improved means are had for supporting the sheet screen element in a manner to prevent cutting or abrasion of the same.

Another feature of the invention resides in the provision of an improved sheet screen type of filter structure in accordance with the foregoing, wherein the screen element is very tightly held and has little movement, if any, when the filter is in operation.

Other features and advantages will hereinafter appear.

In the drawings accompanying this specification, similar characters of reference are used wherever possible to designate like components throughout the several views, in which:

FIG. 1 is an axial section view of a filter structure as provided by the invention.

FIG. 2 is a transverse sectional view, enlarged, taken on the line 2—2 of FIG. 1.

FIG. 3 is an exploded perspective view of portions of the filter structure constituting the supporting frame or cage, prior to their assembly.

FIG. 4 is a fragmentary transverse sectional view similar in part of the section in FIG. 2 but showing a modification of the invention.

Referring to FIGS. 1–3, the improved filter structure of the present invention is shown as comprising an elongate, tubular casing 10 having at one end an integral connector portion 11 of reduced diameter, provided with a central internally threaded bore 12 by which connection may be made to a suitable threaded pipe or fluid line.

At its other end the casing 10 is internally threaded and has screwed into it a nipple fitting 14 having a central bore 15 provided at one end with internal threads 16 for attachment to a threaded pipe or fluid line. The nipple 14 and the connector portion 11 of reduced diameter preferably have outer peripheries of hexagonal or flatted shape to accommodate a suitable wrench, which will be readily understood.

Between the large threaded end 18 of the casing 10 and an annular shoulder 19 on the nipple 14 an O-ring 20 is provided, to effect a tight seal when the nipple is screwed into the casing.

In accordance with the present invention there is provided in the casing 10, and preferably carried on the inner end of the nipple 14 a novel and improved filter structure by which fluid entering the casing 10 at the right end thereof will be filtered or screened and cleaned of undesired particles prior to its leaving the casing through the nipple fitting 14 at the left end of the casing. This improved filter structure is of the type employing a thin sheet screen element which is supported by a rigid frame or cage for the purpose of passing fluid through the element, for filtering thereby. The invention provides a novel construction of such filter, by which the greatest possible use is made of the filtering medium thereof and at the same time the filtering element may be formed or cut so as to virtually completely eliminate any waste or scrap material. Additionally, the rigid supporting framework or cage is relatively simple, light and strong, and eliminates the need for a central core or pipe member.

By virtue of the foregoing, appreciable savings are effected in the manufacture of the filter structure, especially savings in materials while at the same time a highly efficient and effective filter unit is provided which has desirable operating characteristics. Such filter unit has, for example, a pressure drop which is commensurate with disk-type filters of the same type and rating. Moreover, in the small sizes or diameters, the present filtering structure has superior characteristics in that more effective or working surface is available for filter purpose, resulting in a higher efficiency. The filter structure further embraces a flexibility in that screen elements of various different shapes and total areas may be readily adapted for use, without impairing the aforementioned advantages and desirable characteristics.

Accordingly, as seen in FIGS. 1 and 2, the filter structure comprises a folded sheet screen 22 having a plurality of reverse bends 23 and 24 by which it is given a corrugated shape. The screen element 22 is, moreover, folded or bent to constitute an enclosure or a portion of an enclosure, and preferably as seen in FIG. 2 the filter element is tubular and has a star-shaped configuration when viewed in cross section or from an end. Such filter structure may be readily, economically formed by being cut from sheet stock in rectangular outline and thereafter reversely bent as indicated, with the two longitudinal edges of the element secured together to form a continuous tube, as by soldering, welding, or any other suitable joining technique. Preferably the folds of the filter or screen element are made quite deep and arranged in pairs, each pair constituting a leg or point, so to speak, of the star shape. It will be understood that while the folds may be as shown in FIG. 2, the depths thereof can vary while achieving satisfactory results. Moreover, the portions of the screen elements constituting the pairs are preferably substantially parallel, and extend virtually radially from the axis of the filter.

Further, in accordance with the invention, there is provided a novel and improved supporting cage structure, which is disposed within the screen element 22 and which sturdily supports the latter to enable the fluid medium which is to be filtered to pass inward from the outside of the screen element 22 to the interior thereof. The said supporting frame is seen to comprise a plurality of elongate corrugated supporting strips 27 arranged to constitute the sides of the cage, and to further comprise star-shaped end supports 28 and 29 together with annular intermediate supports 30. The annular intermediate supports 30 are in the form of simple rings, to which the elongate corrugated strips 27 are attached as by means of brazing, welding or the like. The ends 32 of the strips 27 are secured to the points or radially extending fingers 34 of the end supports 28 and 29, and such securement may also be by welding or brazing or any other suitable technique. By the above construction a supporting cage of generally cylindrical shape is provided, wherein the corrugated supporting strips extend longitudinally or axially and are further disposed to lie generally in radial planes, as seen in FIG. 2.

The supporting cage or frame as constituted of the corrugated strips 27 and the annular supports attached thereto is disposed within the screen element 22 as seen in FIGS. 1 and 2 in such a manner that the pairs of parallel portions of the screen element are disposed on opposite sides of the corrugated strips 27 and are supported thereby.

Completing the filter structure is a shallow solid end cup 38 which is secured to one end of the assembled supporting frame and screen element, and an annular, recessed end support 40 which is secured to the other end of the frame and screen element. The end support 40 has a bore which is of a diameter to receive and closely fit a tubular inner extension 41 on the nipple fitting 14. Also, the end support 40 is provided with an O-ring 42 to provide a seal between the support and the nipple. The end members 38 and 40 are preferably adhered to the screen element 22 as by soldering or other suitable means, and may be further secured to the end supports 28 and 29, if an extra rigid or sturdy assemblage is required.

With the above structure the screen element 22 has a very large, exposed and active surface, all portions of which are effective in passing the fluid medium which is to be screened or filtered. At the same time, a sturdy and reliable support for the screen element 22 is provided by the frame or cage constituted of the corrugated strips 27 and the annular supports 28, 29 and 30 secured thereto. No central heavy pipe or tube is required, to extend through the tubular filter structure as above set forth, and in consequence there is effected a saving of material and a further economy of manufacture.

The fluid which is to be filtered is brought into the casing 10 at the right end thereof, and such fluid passes through the fine interstices or openings in the screen element to the interior thereof, and thereafter passes out of the casing 10 through the bore 15 in the nipple fitting 14. By virtue of the rugged internal support for the filter screen element 22 as above described, the said element is able to withstand appreciable fluid pressure on its outside surface without failure.

A modification of the invention is illustrated in FIG. 4, wherein the supporting frame or cage is provided with a plurality of elongate, sheet-like foraminous shields 45 which are U-shaped in cross section and disposed along the outer edges of the corrugated strips 27, within the outer bends of the screen element 22. The shield pieces 45 are preferably formed from heavier screen material than the screen element 22. By the provision of the shield pieces 45 the likelihood of the screen element 22 becoming abraided or cut is virtually completely eliminated.

The above filter structure may be readily disassembled and cleaned by merely unscrewing the nipple fitting 14 from the casing 10 and withdrawing the fitting. The filter structure carried by the fitting will come out with the latter, and the casing may be cleaned of foreign matter, as well as the exterior of the screen element 22. By a reverse flush procedure in suitable apparatus, the interstices of the screen element 22 may be further cleaned, whereupon the filter may be again assembled and put into use.

The structure as above set forth is seen to be relatively simple and compact, involving few parts of simple construction. The screen element 22 by virtue of its being fabricated from a rectangular-shaped piece of material, involves no waste and accordingly there is effected by this feature a desirable economy of manufacture and saving of material.

Variations and modifications may be made within the scope of the claims, and portions of the improvement may be used without others.

We claim:

1. A filter comprising an imperforate cylindrical casing, closure means closing both ends of said casing and providing inlet and outlet ports thereto, at least one of said means being readily detachably connected to said casing to provide access to the interior thereof, and an elongated filter element carried within said casing between said closure means, said filter element being substantially star-shaped in cross section and comprising a single sheet of foraminous material formed into a series of ridges and valleys about a cylindrical axis, a support for said filter comprising a pair of longitudinally spaced star-shaped end members having radially extending fingers, one of said end members being formed with an axial opening therethrough, said fingers of one star-shaped member being aligned with the fingers of the other star-shaped member, said filter element having opposite ends fixed to said star-shaped members, a longitudinally extending strip fixed to and connecting each pair of aligned fingers inwardly of said filter element, there being a strip supporting each ridge of said filter element, said strips being corrugated with the folds thereof extending in radial directions, at least one annular member between said star-shaped members and in axial alignment therewith, and said strips being fixed to and supported on the periphery of said annular member.

2. The invention as defined in claim 1, there being sheet-like, elongate, foraminous shield pieces extending along the outer edges of said strips between the same and said ridges of said filter to prevent abrasion of said filter.

3. The invention as defined in claim 2, wherein said shield pieces comprise elongated U-shaped channel members embracing said strips.

References Cited in the file of this patent

UNITED STATES PATENTS

| | | |
|---|---|---|
| 1,896,395 | Dooley | Feb. 7, 1933 |
| 1,906,984 | Lyman | May 2, 1933 |
| 2,263,853 | ReQua | Nov. 25, 1941 |
| 2,383,066 | McDermott | Aug. 21, 1945 |
| 2,397,759 | Sigmund | Apr. 2, 1946 |
| 2,464,870 | Kamrath | Mar. 22, 1949 |
| 2,559,614 | Hapman | July 10, 1951 |
| 2,598,210 | Beacham | May 27, 1952 |
| 2,608,302 | Mattel | Aug. 26, 1952 |
| 2,914,179 | Foust | Nov. 24, 1959 |
| 3,007,238 | Pall | Nov. 7, 1961 |